Feb. 13, 1940.  A. BERGERON  2,190,204
PISTON RING
Original Filed Oct. 17, 1936
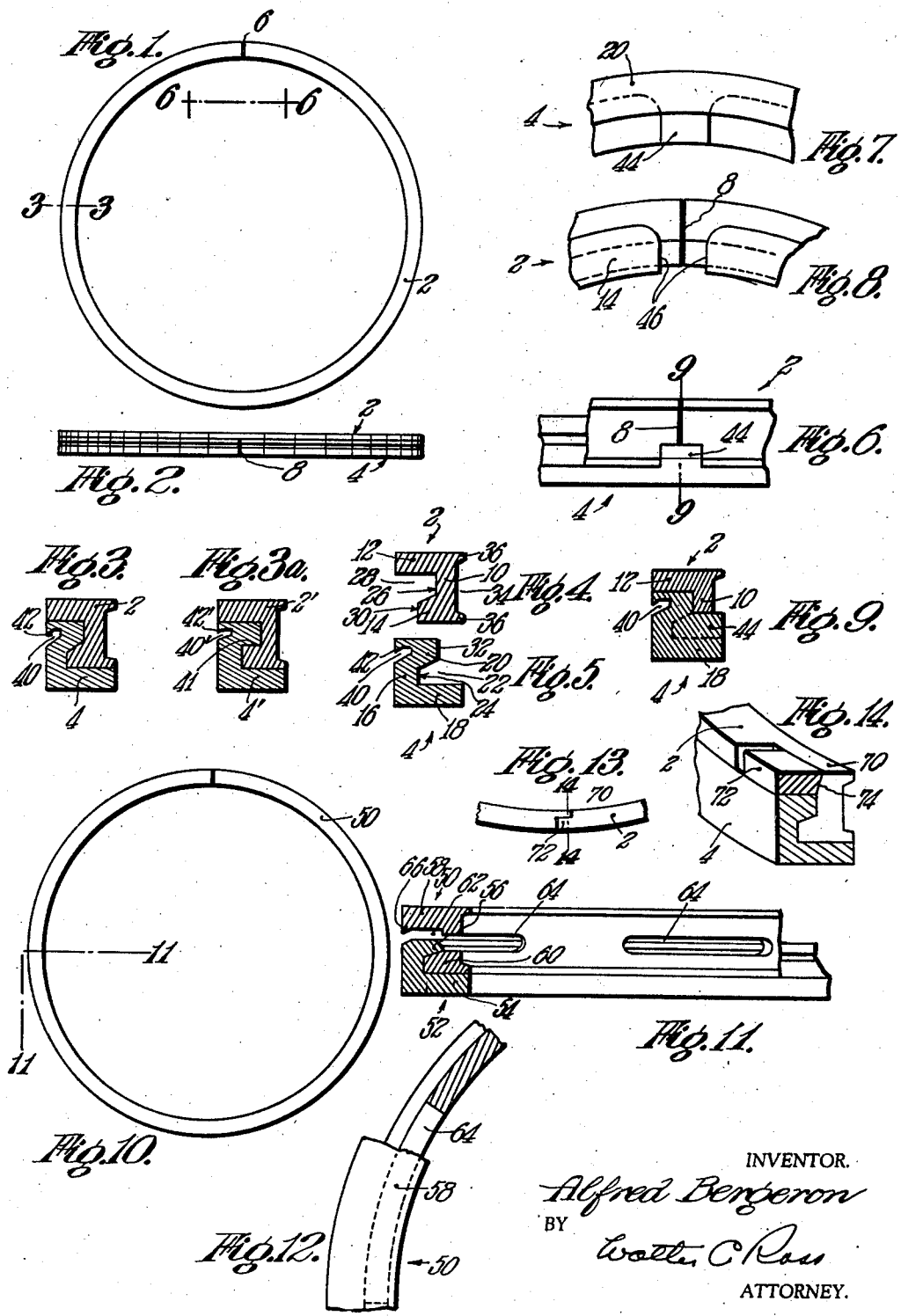
INVENTOR.
Alfred Bergeron
BY
Walter C. Ross
ATTORNEY.

Patented Feb. 13, 1940

2,190,204

UNITED STATES PATENT OFFICE 2,190,204

PISTON RING

Alfred Bergeron, Chicopee Falls, Mass.

Application October 17, 1936, Serial No. 106,123
Renewed December 16, 1939

5 Claims. (Cl. 309—45)

This invention relates to improvements in piston rings and is directed more particularly to improvements in expanding piston rings made up of interlocking sections or members.

One object of the invention is the provision of a ring consisting of interlocking ring members wherein the interlocking or abutting surfaces of the ring members abut one another throughout relatively large areas. This makes it possible to not only accurately machine the parts so that they fit together accurately but results in a saving in manufacturing costs as well.

Another object of the invention is the provision of a piston ring of the class described wherein the inner surface of the ring which bottoms in the groove of the piston is recessed thereby making it possible for the ring to seat and fit properly in the groove and provide a space for a spring member between the inner side of the ring and the bottom of the groove.

Another object of the invention is the provision of an oil groove at the outer side of the ring which has a wiping lip to insure a proper wiping action on the cylinder wall when the piston ring travels down the cylinder bore.

A further object of the invention is the provision of means to prevent relative rotation of the ring sections when assembled. This is accomplished by providing on one of the sections an integral lug or lock which fits in a slot in the other section, thereby to insure a positive efficient lock.

A still further object of the invention is the provision of a ring of the class described wherein passageways are provided which extend through the ring to facilitate oil being delivered through the ring into the groove in which the ring is seated.

Various other novel objects and advantages of the invention will be hereinafter more fully described in connection with the accompanying description of the invention with reference to the accompanying drawing wherein:

Fig. 1 is a plan view of a piston ring embodying the novel features of the invention;

Fig. 2 is a side elevational view of the piston ring shown in Fig. 1;

Fig. 3 is a sectional view on the line 3—3 of Fig. 1 to illustrate certain features of the invention;

Fig. 3a is a view similar to Fig. 3 showing a modified form of the invention;

Fig. 4 is a cross sectional view through the upper ring section of the piston ring;

Fig. 5 is a cross sectional view through the lower section of the piston ring;

Fig. 6 is an elevational view taken on the line 6—6 of Fig. 1;

Fig. 7 is a fragmentary plan view of the lower piston ring to show the lock feature;

Fig. 8 is an inverted fragmentary plan view of the upper piston ring to show the lock receiving groove;

Fig. 9 is a sectional view on the line 9—9 of Fig. 6;

Fig. 10 is a plan view similar to Fig. 1 showing a modified form of the invention;

Fig. 11 is a sectional elevational view on the line 11—11 of Fig. 10;

Fig. 12 is a fragmentary plan view of the upper ring section of the modification shown in Figs. 10 and 11;

Fig. 13 is a fragmentary plan view illustrating how the end portion of a ring section interfits; and Fig. 14 is a combined sectional and perspective view taken on line 14—14 of Fig. 13.

With reference to the drawing the invention will now be more fully described.

The piston ring of the invention shown in Figs. 1 and 2 consists of an upper ring section 2 and a lower ring section 4. These are of metal, preferably a good grade of cast iron, and are machined for fitting together. The upper ring is split at 6 and the lower ring is split at 8 so that they may not only be assembled readily in interlocking engagement, but they may be expanded for inserting in the piston groove. They yieldingly bear against the cylinder in which the piston reciprocates.

The upper ring member or section 2 consists of a body portion more or less vertically disposed and indicated by 10 and has an upper outwardly extending flange 12 and a lower outwardly extending base 14. The lower ring member or section has a more or less vertically disposed body portion 16, a lower inwardly extending flange 18 and an inwardly extending head portion 20. Between the head 20 and flange 18 of the lower section there is a socket 22 to receive the base 14 of the upper ring member. The bottom of the socket 22 has a relatively wide flat face 24 against which a similar wide flat face 30 of the base 14 abuts. Likewise a socket 28 of the section 2 has a wide flat face 26 against which a similar flat face 32 of the head 20 abuts. The wide flat faces of the sockets make it easy to machine the parts and they may be machined more accurately so that when the upper ring section is snapped into the lower ring section the parts fit together more accurately.

There is a sharp corner formed by angularly disposed surfaces as shown in the United States Letters Patent 1,549,104 and it is practically impossible to obtain the clean sharp corner since the necessarily sharp edge of the tool used in cutting the ring becomes worn while the sharp corner of the male part becomes burred with the result that the male part does not fit in the V shaped notch wherefore the ring sections do not fit together.

The inner side of the upper ring is recessed at 34 and this may be accomplished by a machining operation leaving beads 36. This is desirable since it renders the ring more flexible and provides a space between the inner face of the ring and the bottom of a groove in the piston in which space may be placed a ring expander formed from a flat spring frequently used to expand piston rings.

An oil groove is provided in the ring and this may be located in the lower section 4. The groove is indicated by 40 and as a special feature there is a lip 42 at the entrance to the groove which as the piston moves downwardly in the piston bore the said lip wipes the cylinder wall. This has been found to be very desirable and necessary as it insures that the wall is properly wiped during the reciprocation of the piston. As will be appreciated the sections are assembled so that the parts 14 and 20 of the sections 2 and 4 are received in the sockets. The parts may be assembled by slightly contracting the upper section and slightly expanding the lower section. When so assembled the split of one section is disposed opposite to or at least at a considerable angle from the split of the other section.

So that the sections may be maintained in this position and prevented from relative rotation there is a key 44 extending inwardly on top of the lower flange 18 of the lower section 4 which is integral with the section. This key or lock may be formed at the time the socket 22 is formed. This is easily accomplished by running the cutter or cutting the socket around the section and stopping it so as to leave said lock or key. The key is integral with the ring section which is desirable as it makes for rigidity and obviates extra machining operations and loose parts which tend to work out of place and score the cylinder wall.

The face 14 of the upper ring section at the sides of the split is cut away to form a slot indicated by 46 which receives the locking key 44 when the ring sections are assembled.

As shown in Fig. 3 when the parts are in assembled relation the parts 14 and 20 interfit with the sockets 22 and 28. By providing the flat surfaces previously referred to the ring sections may be accurately interlocked. It is not difficult to provide the flat faces 24 and 26 in the sockets nor the flat faces 30 and 32 wherefore the sections may assume the desired relationship.

In lieu of the angular surfaces forming a side of the sockets 22 and 28 shown in Figs. 3, 4, and 5 the said surfaces may be horizontal as shown in Fig. 3a.

The modification of the invention shown in Figs. 10, 11 and 12 will now be described:

In this form of the invention there is an upper ring section 50 and a ring lower section 52 which are split as explained in connection with Figs. 1 and 2. The lower section has a flange 54 and a head 56 while the upper ring section has a flange 58 and a base 60. These are formed similarly to the sections previously described. Preferably the upper side of the head 56 of the lower section is spaced from the flange 58 of the upper section to provide an oil slot 62. The lower section is provided with one or more slots 64 therethrough which are in communication with the slot 62.

This ring construction is adapted for use in the lower oil groove of a piston so that oil in the operation of the piston passes through the slot 62 between the sections and through the slots 64 of the lower section into the ring groove and through an opening in the piston groove when the same is employed.

There is a lip 66 on the flange 58 of the upper section at the entrance to oil slot 62 which functions with wiping action. This is very much to be desired in connection with rings of this type. The inner face of the lower section is recessed as shown and the sections 50 and 52 are provided with a locking key and slot such as shown in Figs. 6, 7 and 8.

Instead of the substantially straight-across ends of the rings to provide a joint less likely to leak the ends of the ring sections may be formed as in Figs. 13 and 14. The upper part 12 of the upper ring section is cut away to provide lips 70 and 72 and adjacent faces 74 thereof are preferably bevelled as shown. The ends of the lower ring are similarly formed.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

1. A piston ring comprising in combination, upper and lower split ring sections, the lower ring section having a vertical body portion and inwardly extending lower flange and upper head portions with a socket therebetween, the upper ring section having a vertical body portion and outwardly extending upper flange and lower base portions with a socket therebetween, the bottoms of said sockets being relatively wide and flat and the said head and base disposed in said sockets and provided flat end faces bearing on the flat bottoms of the sockets, the said sections being formed to provide a radially extending oil slot therebetween and the lower section having a radially extending slot leading into said slot.

2. A piston ring comprising in combination, upper and lower split ring sections, the lower ring section having a vertical body portion and inwardly extending lower flange and upper head portions with a socket therebetween, the upper ring section having a vertical body portion and outwardly extending upper flange and lower base portions with a socket therebetween, the bottoms of said sockets being relatively wide and flat and the said head and base disposed in said sockets and provided flat end faces bearing on the flat bottoms of the sockets, the said sections being formed to provide a radially extending oil slot therebetween and the lower section having a radially extending slot leading into said slot, and a wiping lip at the entrance to said first named slot.

3. A piston ring comprising in combination, assembled upper and lower split ring sections, the lower ring section having a vertical body portion and inwardly extending lower flange and upper head portion with a socket therebetween, the upper ring section having a vertical body portion inside the corresponding portion of the lower ring section and an outwardly-extending upper flange overlying the head portion of the lower ring and a base portion in the socket of the lower ring socket, the upper ring section being provided with horizontal radial slots extending through the vertical body portion thereof, and the head portion of the lower ring section and the upper flange portion of the upper ring section being spaced to provide a horizontal slot in communication with the first named slot.

4. A piston ring comprising in combination, assembled upper and lower split ring sections, the lower ring section having a vertical body portion and inwardly extending lower flange and upper head portion with a socket therebetween, the upper ring section having a vertical body portion inside the corresponding portion of the lower ring section and an outwardly-extending upper flange overlying the head portion of the lower ring and a base portion in the socket of the lower ring socket, the upper ring section being provided with horizontal radial slots extending through the vertical body portion thereof, and the head portion of the lower ring section and the upper flange portion of the upper ring section being spaced to provide a horizontal slot in communication with the first named slot, and a wiping lip at the entrance to said last-named slot.

5. A piston ring comprising in combination, assembled upper and lower split ring sections, the lower ring section having a vertical body portion and inwardly extending lower flange and upper head portion with a socket therebetween, the upper ring section having a vertical body portion inside the corresponding portion of the lower ring section and an outwardly-extending upper flange overlying the head portion of the lower ring and a base portion in the socket of the lower ring socket, the head portion of the lower ring section and the flange portion of the upper section being spaced to provide a circumferential inwardly extending slot, and the body portion of the upper ring section being provided with horizontally disposed slots in register with the first-named slot.

ALFRED BERGERON.